Feb. 20, 1934.                H. R. ISENHOWER                1,947,600
                                SALT SHAKER
                             Filed Aug. 15, 1932
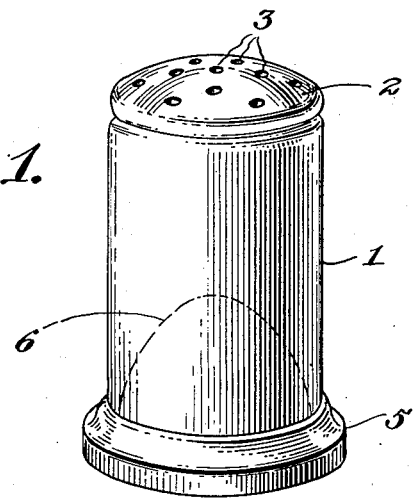
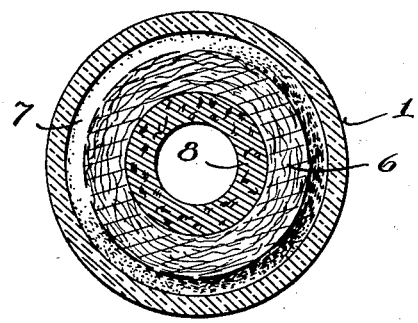
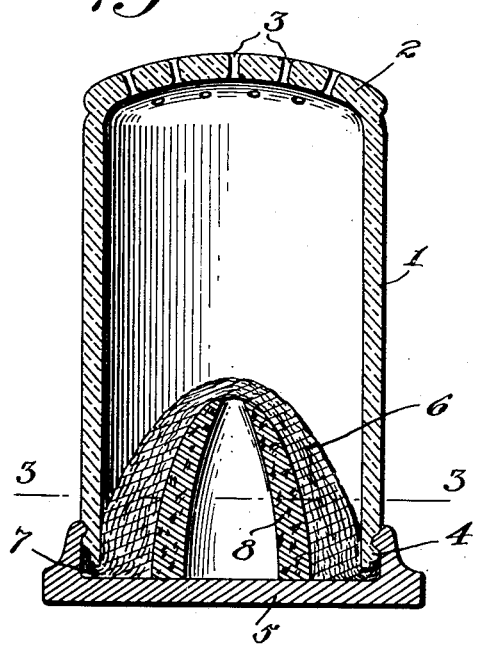
Inventor
*H. R. Isenhower*
By *Eccleston & Eccleston,*
Attorneys Patented Feb. 20, 1934

1,947,600

UNITED STATES PATENT OFFICE 1,947,600

SALT SHAKER

Harry R. Isenhower, Bloomfield, Ind.

Application August 15, 1932. Serial No. 628,927

1 Claim. (Cl. 65—45)

This invention relates to condiment holders and dispensers such as salt shakers, in which a container is provided with a plurality of perforations of suitable size to permit the salt to be sifted on articles of food, etc. In such devices the size of the openings is always sufficiently small to restrict the flow of salt and by reason of that fact the shakers often become clogged in damp weather. This clogging is due to the fact that salt being deliquescent absorbs moisture from the damp air and when in that condition adheres to the edges of the dispensing openings. Clogging of salt shakers is also caused by the tendency of the moist salt particles to adhere to each other and form a solid lump or lumps within the body of the container.

Many attempts have been made to prevent the packing of salt in damp weather, both by providing means to absorb the moisture from the salt and also by means of mechanical devices to break up the lumps of salt after it has become packed. These various means have not been entirely successful either because they were too expensive to be practical, were ineffective in accomplishing their purpose, or were unsightly and unattractive in appearance.

It is an object of the present invention to provide a simple and inexpensive yet highly effective means for absorbing moisture from the air and salt in a shaker so as to facilitate the discharge of the salt even in damp weather.

A further object of the invention resides in the provision of a moisture absorbing means which may be fixedly secured in a shaker by clamping the same between the end of the shaker and its cover.

A still further object of the invention consists in arranging and mounting the moisture absorbing material in the shaker so as to present a maximum surface to its contents.

Other objects and advantages of the invention will be apparent from the following description when taken in connection with the accompanying drawing; in which Figure 1 is a perspective view of one form of salt shaker in which the present invention is incorporated.

Figure 2 is a vertical sectional view through the disclosure of Figure 1.

Figure 3 is a horizontal sectional view taken on line 3—3 of Figure 2; and

Figure 4 is a perspective view of the cone-shaped body of cellulosic material, partly broken away, combined with the member for holding the material in distended position.

Referring to the drawing in more detail, the numeral 1 indicates the body of the salt shaker which is shown as formed of glass or the like and provided with an integral top 2 in which are formed a plurality of perforations 3 of the conventional size used in salt shakers. These openings are of sufficiently small diameter to prevent the salt when in dry condition from freely running therethrough, but are large enough to permit the dry salt to be shaken out when desired.

The bottom of the container 1 in the present embodiment, is open and is provided with screw threads or the like 4 by means of which a bottom closure 5 may be attached.

The moisture absorbing material is indicated by the numeral 6 and is preferably cellulose or a cellulosic composition. This material is preferably arranged in the form of a hollow cone as indicated in Figs. 2 and 4, so as to provide an extended surface to be presented to the contents of the shaker. This cone-shaped body is also provided with a flange 7 which, as indicated in Fig. 2, is positioned between the lower end of the container and the bottom closure 5 so that when the closure is screwed into position the flange is clamped between the closure and the container and fixedly secures the cone-shaped body of cellulose in position.

In order to prevent the collapse of the hollow body of cellulose, a hollow cone-shaped member 8, preferably of cork, is mounted in the hollow formed in the cellulosic body. The body 8 is of very light weight but nevertheless serves to hold the cone-shaped body of cellulose in distended position, and furthermore no special means is required to secure the member 8 in position since the cellulose and the closure 5 form a confining means for this member.

In operation the closure and the moisture absorbing material being removed, the salt is placed in the container and the closure with the cork member 8 and the body of cellulose mounted thereon are applied to the container in the manner shown in Fig. 2. With the container as thus constructed, the cellulosic material will serve to absorb from both the atmosphere and the salt within the container any excess moisture and will thus maintain the salt in a comparatively dry condition. It will be obvious, therefore, that any liability of the salt to stick within the discharge openings 3 or to pack within the container in the form of lumps is avoided.

While a more or less special form of salt shaker is disclosed herein, it will be understood that the essence of the present invention may be readily incorporated in various types of salt shakers.

In accordance with the patent statutes I have described what I now believe to be the preferred form of construction, but it is apparent that various minor changes may be made in the construction and arrangement of the moisture absorbing medium, and all such modifications are intended to be included within the scope of the appended claim.

What I claim is:

A salt shaker including a receptacle, a cover for the receptacle, a hollow body of absorbent cellulosic material, a flange formed on said body, a cork member positioned in the hollow of the cellulosic body, said flange being clamped between the end of the receptacle and the cover whereby both the cellulosic body and the cork member are fixedly secured in position.

HARRY R. ISENHOWER.